UNITED STATES PATENT OFFICE.

STEPHEN BARKER, OF KNOXVILLE, TENNESSEE, ASSIGNOR OF NINE-TENTHS OF HIS RIGHT TO J. P. HARGER, OF PONTIAC, MICHIGAN, AND C. C. McCARTY, OF KNOXVILLE, TENNESSEE.

IMPROVEMENT IN PROCESSES OF MAKING STEEL.

Specification forming part of Letters Patent No. 179,393, dated July 4, 1876; application filed June 26, 1876.

*To all whom it may concern:*

Be it known that I, STEPHEN BARKER, now resident of Knoxville, in the county of Knox and State of Tennessee, have invented certain new and useful Improvements in the Process of Making Steel; and I do hereby declare that the following is a full, clear, and exact description thereof, which will enable others skilled in the art to which it appertains to make and use the same.

My improvement consists in taking the following brands of pig metal, known by their trade-mark as follows: Carter cold-blast charcoal pig metal; Eagle cold-blast charcoal pig metal; Embreeville cold-blast charcoal pig metal; Pottsdale cold-blast charcoal pig metal; Unaka cold-blast charcoal pig metal, and working them in a common puddling-furnace.

I first prepare my puddling-furnace by fixing or lining it with pulverized fossiliferous and magnetic-iron ore (or with shady and other ores) around the sides, and prepare the bottom of the furnace by melting wrought-iron scrap; and when the side fixing and bottom of furnace are set and ready to receive the charge of pig metal, I first put into furnace ten per centum of slag or roll scale, with the following weights of pig metal of the brands before mentioned: For every four hundred pounds of iron to be puddled, two hundred pounds of Carter cold-blast; fifty pounds of Eagle cold-blast; twenty-five pounds of Pottsdale cold-blast; fifty pounds of Embreeville cold-blast; fifty pounds of Unaka cold-blast; or other pig metals of the same grade and nature, and having the same affinity to mix with the chemicals, may be used in the proper proportions.

To fire the furnace I use bituminous lump-coal, as preferable. After the iron is melted (or while melting) I then introduce three pounds pulverized magnetic-iron ore, and mix this with the melted iron. After this is well worked through the iron, and the iron begins to come up to a boil, I then add the following chemicals, with the damper down on the stack close enough to carry off the waste smoke; Black oxide manganese, one and a half pound; carbonate soda, one-half pound; pulverized oyster-shell, three pounds; common salt, four pounds; soda-ash, one-quarter pound.

I do not boil the iron as hot as is required for making puddle-iron for wrought-iron purposes; but I keep it at a proper heat, so as not to drive out the effect of the chemicals. When the iron has been worked thoroughly and made into four puddle-balls it is then drawn and hammered out into blooms. It is then reheated in a common heating-furnace, and hammered into flat bars four by three-quarter inches—four inches wide by three-fourths of an inch thick. I then cut these bars up into small pieces about half-pound in weight. I then put these small pieces of iron into a common crucible, with one-half pound of black oxide of manganese; one pound of common salt; one-half pound powdered oyster-shell. These chemicals are introduced into the crucible when putting iron in for smelting, and infuse through the iron when melting.

I am aware that chemicals have been used for making steel in the puddling-furnace. I do not think the chemicals as I have combined them have been used for making steel in the puddle-furnace and crucible.

By my invention and process, as above detailed, the metals yield more readily to the chemicals to produce their effect through the iron. By introducing the pulverized oyster-shell a finer flux is given to the iron, which boils the iron longer, and casts off impurities and gives a finer grade of steel.

In place of oyster-shells I may substitute wood-ashes in the same proportion.

As stated above, the temperature during the boiling should be only such as to mix the materials without drawing off the chemicals, which can be ascertained by the operator. I have given the proper qualities of iron to be used; but it is well known to iron-masters that other brands of iron possess substantially the same properties, and may be used instead of those named without departing from the nature of my invention.

Having thus described my invention, what I claim, and desire to secure by Letters Patent, is—

1. The improved process herein described for producing puddled steel from pig-iron, consisting in melting cold-blast pig-iron of the grades named with magnetic oxide of iron, and then introducing a compound of manganese, alkaline salts, and lime-salts, substantially in the manner and proportions as set forth.

2. The process herein described for refining and finishing puddled steel, consisting in reducing it to billets and melting in a crucible with manganese, oxide, common salt, and oyster-shells, substantially in the manner and proportions set forth.

In testimony that I claim the foregoing as my own I affix my signature in presence of two witnesses.

STEPHEN BARKER.

Witnesses:
  LEWIS TILLMAN, Jr.,
  JULIUS OCHS.